Patented July 26, 1938

2,124,863

UNITED STATES PATENT OFFICE 2,124,863

METHYL-AMINONAPHTHALENE-SULPHONIC ACIDS AND PROCESS OF PREPARING THEM

Adolf Sieglitz, Frankfort-on-the-Main, Germany, assignor to General Aniline Works, Inc., New York, N. Y., a corporation of Delaware No Drawing. Application July 6, 1936, Serial No. 89,250. In Germany July 6, 1935

3 Claims. (Cl. 260—129)

The present invention relates to methyl-aminonaphthalene-sulphonic acids and to a process of preparing them; more particularly it relates to compounds of the following formula:

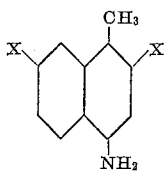

wherein one X stands for the sulphonic acid group and the other X for hydrogen.

I have found that sulphonic acids of 1-methyl-4-amino-naphthalene, which have hitherto not been described, are obtained by causing a sulphonating agent to act on this base at a temperature between about 100° C. and about 160° C. The sulphonic acids thus obtained, the 1-methyl-4-aminonaphthalene-2-sulphonic acid and the 1-methyl-4-aminonaphthalene-7-sulphonic acid, may be separated from each other by taking advantage of the different solubilities of their alkali salts, for instance, in water, alkalies in excess or alcohols.

The two new compounds are valuable parent materials for the manufacture of new intermediate products of the naphthalene series and of new dyestuffs.

The following examples serve to illustrate the invention, the parts being by weight, unless otherwise stated and the relationship between parts by weight and parts by volume being that of the kilo to the liter:

1. 157 parts of 1-methyl-4-aminonaphthalene are introduced within half-an-hour into 200 to 300 parts by volume of concentrated sulphuric acid or sulphuric acid monohydrate at a temperature of 120° C. and the mixture is heated for one hour at 150° C. The sulphonation product is then introduced into 1000 parts of water and 500 parts of ice, filtered with suction, pressed and dried. A mixture is obtained with a very good yield, consisting of about 65 per cent. of 1-methyl-4-aminonaphthalene-2-sulphonic acid and about 35 per cent. of 1-methyl-4-aminonaphthalene-7-sulphonic acid.

The same product is formed by heating for 6 hours at 120° C. after the base has been introduced. Thereby a somewhat larger proportion of the 1-methyl-4-aminonaphthalene-2-sulphonic acid is obtained and a smaller proportion of the 1-methyl-4-aminonaphthalene-7-sulphonic acid.

2. The product obtainable as described in Example 1 is introduced into 1500 parts of water and 200 parts by volume of caustic soda solution of 40° Bé., the solution is filtered, and the sodium salt of the 1-methyl-4-aminonaphthalene-7-sulphonic acid is precipitated by slowly introducing into the filtrate 300 parts of sodium chloride, while stirring. After 12 hours' stirring, the sodium salt is filtered with suction and pressed. By acidifying the filtrate with a mineral acid, the 1-methyl-4-aminonaphthalene-2-sulphonic acid is obtained.

Both the sulphonic acids and their alkali salts are feebly grey crystalline powders. In an aqueous solution the 1-methyl-4-aminonaphthalene-7-sulphonic acid yields by addition of ferric chloride a blue coloration, whereas the 2-sulphonic acid does not become colored.

The constitution of the two new acids has been proved by de-amidizing and converting the methylnaphthalenesulphonic acids obtained into the corresponding methyl-naphthols by the known process. Thereby, the 1-methyl-4-aminonaphthalene-2-sulphonic acid is transformed into the known 1-methyl-2-hydroxynaphthalene, melting at 110° C., and the 1-methyl-4-aminonaphthalene-7-sulphonic acid into the known 1-methyl-7-hydroxynaphthalene, melting at 69° C. to 70° C.

3. 157 parts of 1-methyl-4-aminonaphthalene are introduced into 300 parts by volume of concentrated sulphuric acid so slowly that the temperature does not exceed 50° C. 400 parts of fuming sulphuric acid containing 20 per cent of sulphuric anhydride are then introduced, drop by drop, within about 40 minutes at a temperature of 100° C. The whole is heated for further 10 minutes at 100° C., the sulphonation mixture is introduced into 1000 parts of water and 500 parts of ice and the whole is worked up as indicated in Example 1.

4. 157 parts of 1-methyl-4-aminonaphthalene are introduced into 300 parts by volume of concentrated sulphuric acid at a temperature of 50° C. 116 parts of chlorosulphonic acid are then introduced, drop by drop, within 30 minutes, at a temperature of 100° C. The whole is subsequently stirred for 1 hour at a temperature of 100° C., poured into ice-water and worked up as usual.

I claim:

1. The process which comprises causing a sulphonating agent to act on 1-methyl-4-aminonaphthalene at a temperature between about 100° C. and about 160° C. and separating the 1-methyl-4-aminonaphthalene-2-sulphonic acid and the 1-methyl-4-aminonaphthalene-7-sulphonic acid obtained from each other by taking advantage of the different solubilities of their alkali metal salts in solvents of the group consisting of water and alcohols.

2. The methyl-aminonaphthalene-sulphonic acids of the following formula:

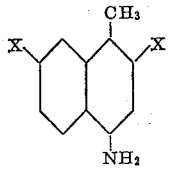

wherein one X stands for the sulphonic acid group and the other X for hydrogen, being feebly grey crystalline powders.

3. The 1-methyl-4-aminonaphthalene-7-sulphonic acid of the following formula:

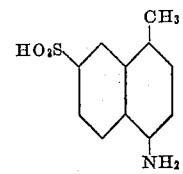

being a feebly grey crystalline powder which yields in an aqueous solution by addition of ferric chloride a blue coloration.

ADOLF SIEGLITZ.